Aug. 1, 1939.  W. C. NABORS  2,168,268
VEHICLE BODY
Filed Sept. 12, 1938   2 Sheets-Sheet 1
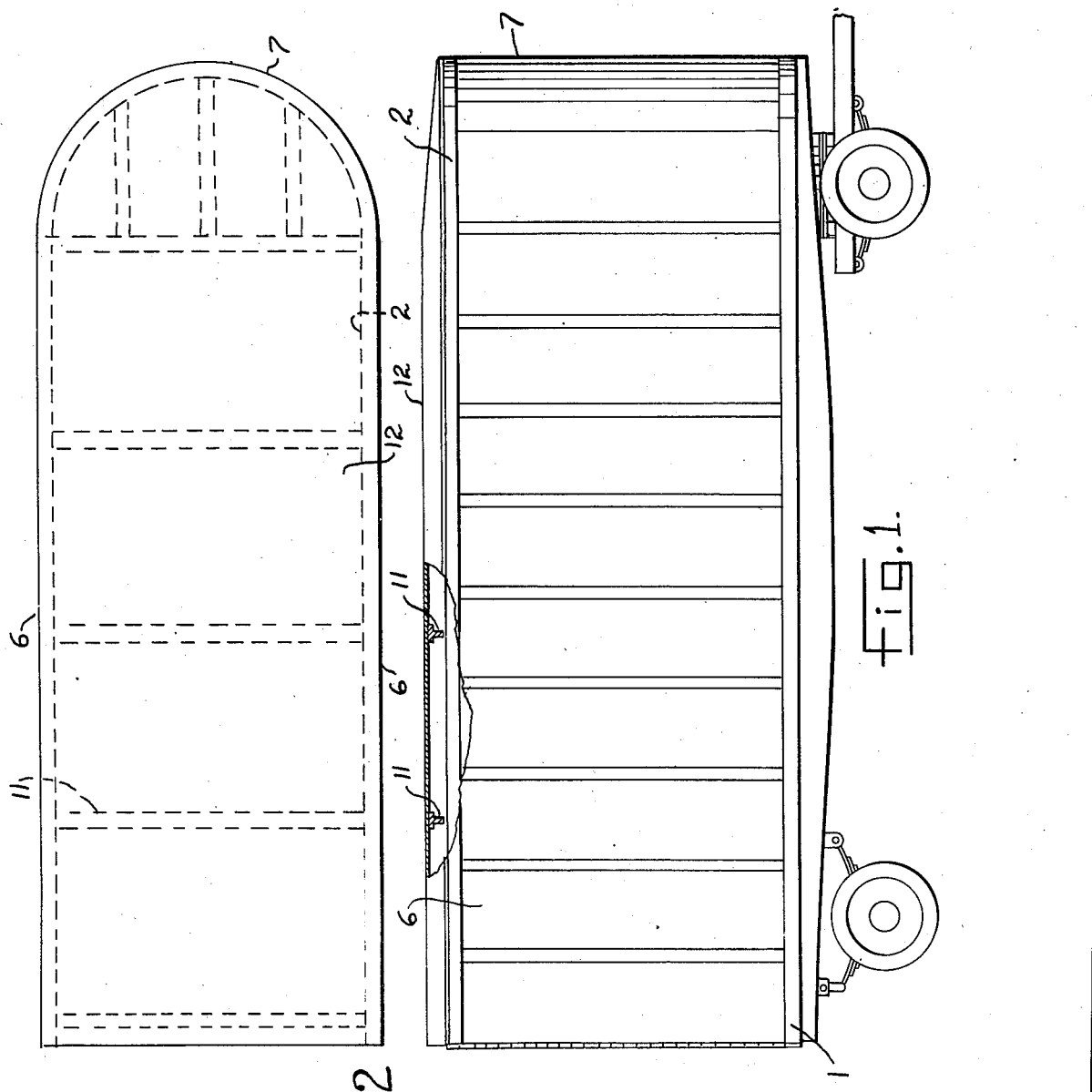
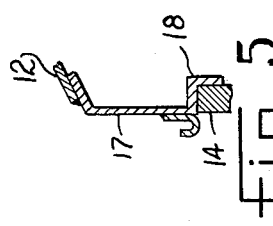
Inventor
WILLIAM C. NABORS Aug. 1, 1939.     W. C. NABORS     2,168,268
VEHICLE BODY
Filed Sept. 12, 1938     2 Sheets-Sheet 2

Inventor
WILLIAM C. NABORS

By
Edward V. Hardway
Attorney

Patented Aug. 1, 1939

2,168,268

UNITED STATES PATENT OFFICE 2,168,268

VEHICLE BODY

William C. Nabors, Mansfield, La.

Application September 12, 1938, Serial No. 229,430

1 Claim. (Cl. 296—137)

This invention relates to a vehicle body and has particular relation to a body for a trailer.

An object of the invention is to provide, in a trailer body, a novel construction for securing the upper margin of the side walls and forward end wall to the roof structure whereby to provide a very strong yet light construction whose parts may be cheaply and quickly assembled, and secured together.

A further object of the invention is to provide a body of the character described whose side and end walls, as well as the doors, are formed of sheet metal with a smooth exterior and with the forward end wall forwardly curved or rounded off, all to minimize wind resistance. The roof is also formed smooth for a like purpose. For strength the sheet metal of which the walls are formed have spaced creases, thus forming vertical external grooves and seated, or located in these grooves, are vertical channels whose cross webs are flush with the exterior surface of the wall and the means for anchoring the upper margins of the walls to the roof structure also includes a novel type of top frame which embraces the upper margins of the walls as well as the upper ends of said vertical channels, whereby the upper margins of the walls, the upper ends of the channels, the roof rafters and the roof may be anchored together.

It is another object of the invention to provide a vehicle body of the character above specified wherein heavy door posts are dispensed with and the rear margins of the wall sheets are formed into door casings, thus conducing to cheapness of construction, lightness, and at the same time maintaining the required strength.

With the above and other objects in view, the invention has particular relation to certain novel features of construction, arrangement of parts and use, an example of which is given in this specification and illustrated in the accompanying drawings, wherein:

Figure 1 shows a side elevation of the body partly in section.

Figure 2 shows a plan view.

Figure 5 shows a fragmentary vertical sectional view taken on the line 5—5 of Figure 3.

Figure 3:
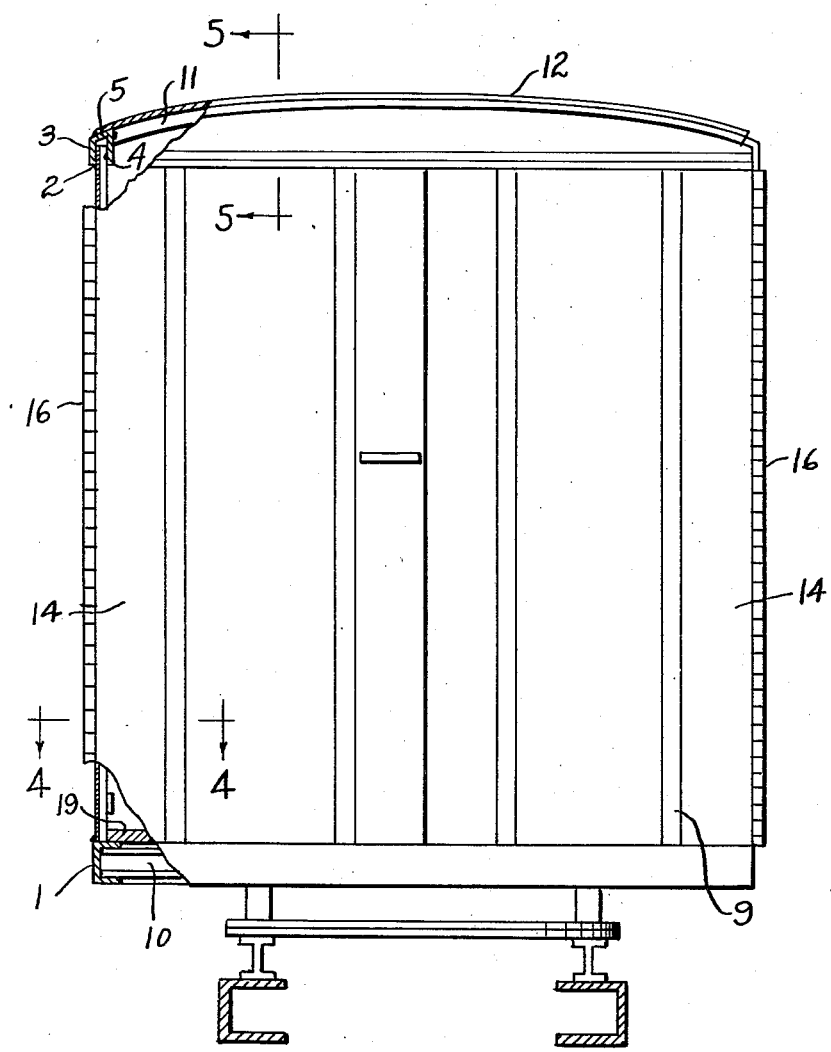
Figure 3 shows a rear end elevation, partly in section.

Referring now more particularly to the drawings, wherein like numerals of reference designate the same parts in each of the figures, the numeral 1 designates the lower frame member of the body which is preferably formed of a channel iron bent into a substantially U-shaped form. The numeral 2 designates an upper frame member which is also bent in a substantially U-shaped form and is vertically aligned above the lower frame member 1. As clearly shown in Figure 3, the upper frame member 2 is channel shaped in cross section, having the depending side flanges and the outwardly declining cross web. The outer side flange is indicated by the numeral 3, the inner side flange is indicated by the numeral 4 and the cross web is indicated by the numeral 5 in Figure 3. The side walls and front end wall are indicated generally by the numerals 6, 6, 7, respectively. They continue from the rear end of the body on one side around the front end and back to the rear on the other side as indicated in Figures 1 and 2. The side walls and front end wall are preferably formed of sheet metal. Generally speaking they present a smooth exterior, but they have the external vertical grooves 8, spaced apart therearound, and formed by creasing the sheet-like material inwardly. The external creases or grooves are filled by the vertical channels 9, also formed of sheet metal, with their marginal flanges directed inwardly and with their cross webs flush with the outer surface of the wall so as to present a smooth external surface to minimize wind resistance and to give a better appearance to the body. These channels 9 may be spot welded in place in accordance with ordinary welding practice. The body has suitable cross braces as 10 preferably, but not necessarily, formed of I-beams whose ends are fitted between the inwardly directed flanges of the lower frame 1. These beams 10 extend transversely of the body and are spaced apart from end to end thereof, to give the required strength.

The lower margins of the wall 6, 7 are supported on the top horizontal flange of the lower frame 1 and may be welded thereto.

As hereinabove stated, the side flanges 3, 4 of the upper frame member 2 are disposed vertically and embrace the upper margins of the side and front walls as well as the upper ends of the channels 9 and may be welded to the walls with the cross web 5 above the upper margins of the walls as shown in Figure 3.

The upper margins of the walls are spaced an appreciable distance beneath the cross web 5 so that during the welding operation the expansion due to heat will not cause the upper margin of the walls to expand and engage said cross web and result in breakage of the welds.

The roof support comprises the transverse T-irons 11 which are slightly arcuate being upwardly bowed or curved. The heads of said T-irons or rafters are directed upwardly with the legs depending therefrom. The ends of the T-irons or rafters 11 abut the inner sides of the upper frame 2 and are welded thereto as shown in Figure 3.

A sheet metal roof 12 is supported on the rafters and may be spot welded thereto. It is upwardly curved or oval as shown. Its side margins and its front margin overlie the downwardly and outwardly declining web 5 of the upper frame member and may be welded thereto.

Figure 4:
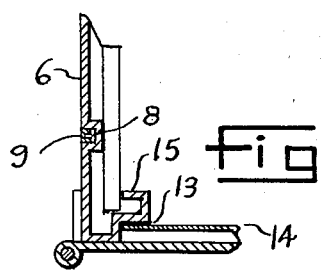
Figure 4 shows a fragmentary, horizontal, sectional view, taken on the line 4—4 of Figure 3.

On each side the rear margin of the wall sheeting is turned inwardly at right angles to the corresponding sides as shown in Figure 4 and is offset inwardly or forwardly forming a door seat 13 to receive the outer margin of the corresponding door 14, when the doors are closed, as shown in Figure 4. The free margin 15, at the rear end of the wall, is retracted outwardly to lend additional strength as also shown in Figure 4. The door casings thus formed may be welded at their lower ends to the lower frame 1 and at their upper ends to the top frame 2.

In the present illustration, the doors 14 are hinged on the vertical hinges 16 to swing outwardly. Above the doors there is a cross plate 17 whose upper margin is inwardly turned to form a support for the rear margin of the roof 12 to which it may be welded. The lower margin of the plate 17 is offset inwardly and turned downwardly as at 18 to form an upper facing to receive the upper margins of the doors when closed as shown in Figure 5.

The body is provided with suitable flooring 19 of any selected type which, if desired, may be supported upon the inwardly turned top flanges of the lower frame.

What I claim is:

A vehicle body comprising a roof and side and front walls, a joint between said roof and walls comprising a substantially U-shaped metal frame having side flanges and a cross-web, the upper margins of the walls extending up between said side flanges but terminating an appreciable distance beneath said cross web, at least one of said side flanges being welded to said walls, transverse rafters each having a transverse head and a depending leg, the ends of the heads and legs of said rafters abutting and being welded to the inner side flanges of said frame, the upper surfaces of the rafters being flush with the upper side of said cross-web, and a sheet metal roof on the rafters whose side and front margins overlie and are welded to the web of said frame.

WILLIAM C. NABORS.